United States Patent [19]

Stoute

[11] 4,245,367
[45] Jan. 20, 1981

[54] DIP STICK WIPER

[76] Inventor: Noel C. Stoute, 5821 SW. 29th Ter., Ft. Lauderdale, Fla. 33312

[21] Appl. No.: 60,138

[22] Filed: Jul. 24, 1979

[51] Int. Cl.³ .............................................. G01F 15/12
[52] U.S. Cl. .................................. 15/210 B; 15/218.1
[58] Field of Search ............... 15/210 B, 218.1, 209 R

[56] References Cited

U.S. PATENT DOCUMENTS

| | | | |
|---|---|---|---|
| 2,207,487 | 7/1940 | Kirkpatrick | 15/210 B |
| 2,259,898 | 10/1941 | Lescher | 15/210 B |
| 4,017,935 | 4/1977 | Hernandez | 15/210 B |

FOREIGN PATENT DOCUMENTS

| | | | |
|---|---|---|---|
| 1444776 | 5/1966 | France | 15/210 B |
| 341263 | 1/1931 | United Kingdom | 15/210 B |
| 710077 | 6/1954 | United Kingdom | 15/210 B |

Primary Examiner—Edward L. Roberts
Attorney, Agent, or Firm—Oltman and Flynn

[57] ABSTRACT

The present dip stick wiper has a holder ring supporting an absorbent foam pad which has a plurality of slits, each capable of slidably passing an oil dip stick with wiping engagement of the pad against the opposite faces of the dip stick. The slits make up a sawtooth pattern in the pad, with a wider slit intersecting the sawtooth pattern at the middle. The wider slit accommodates a twisted dip stick. A ball joint connects the holder ring to a spring clip for snap-on attachment to an oil filler tube or to another tube, rod or bar inside the engine compartment of an automotive vehicle.

3 Claims, 6 Drawing Figures

DIP STICK WIPER

BACKGROUND OF THE INVENTION

Various dip stick wipers have been proposed heretofore for wiping the usual dip stick which is used to determine the engine oil level in automotive vehicles. Such dip stick wipers use a pad or pads of soft, absorbent material for wiping oil from the dip stick.

In several such prior dip stick wipers, the pad presents a single wiping groove for slidably passing the dip stick. Examples of these are shown in the following U.S. Pat. Nos.: Owens 1,664,316, Lescher 2,259,898, Gall 2,470,484, Clark 2,634,445, Desso 2,810,923, Hernandez 4,017,935 and DeVitis 4,103,388. A wiper of this general type for cleaning fishing lines is shown in U.S. Pat. No. 2,700,787 to Trapanese.

In several other prior dip stick wipers, a pad or pair of opposed pads are squeezed manually against the opposite faces of the dip stick to wipe it clean. Examples of these are shown in the following U.S. Pat. Nos.: Bouchard 1,871,208, Shough 2,134,806, Shirk 3,387,314 and Addison et al 4,010,512.

Another type of dip stick wiper is intended to have the dip stick wiped across the outside of the pad, as disclosed in U.S. Pat. No. 1,553,915 to Rix et al.

Almost all of the above-mentioned patents show a spring clip on the like for mounting the wiper pad or pads inside the vehicle's engine compartment, such as on the oil filler tube or a nearby part.

In accordance with the presently-preferred embodiment of the present invention, a wiper pad of soft, absorbent material is mounted inside a holder ring which has a ball joint connection to a spring clip for mounting it on the oil filler tube or some other conveniently located tube, rod or bar in the vehicle's engine compartment. The pad is formed with a plurality of slits, each of which is shaped and dimensioned to slidably receive the dip stick and provide wiping engagement with the opposite faces of the dip stick. Preferably, several of the slits in the pad are inter-connected in a sawtooth pattern extending across the pad. A longer slit, which intersects the sawtooth pattern of slits at the middle, is provided for the purpose of accommodating twisted dip sticks.

In the present invention the provision of a plurality of slits increases the useful life of the wiper pad, enabling the user to select a slit from among those having the least accumulation of oil from previous uses. The ball joint connection between the holder ring for the wiper pad and the spring clip enables the pad to be adjusted to virtually any desired position with respect to the tube, rod or bar on which it is mounted in the engine compartment of the vehicle.

A principal object of the present invention is to provide a novel and improved dip stick wiper to be mounted in the engine compartment of an automotive vehicle.

Further objects and advantages of this invention will be apparent from the following detailed description of a presently-preferred embodiment thereof, which is shown in the accompanying drawing.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
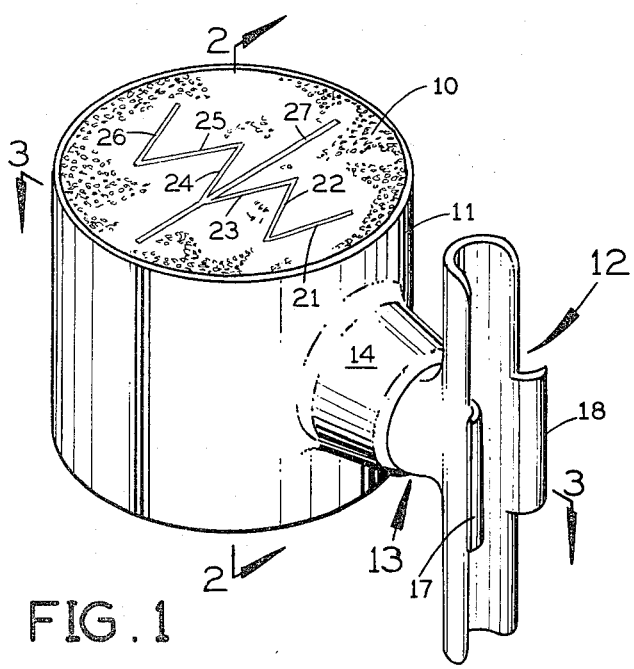
FIG. 1 is a perspective view of the present dip stick wiper.

Referring first to FIG. 1, in broad outline, the present dip stick wiper comprises a soft, porous, absorbent wiper pad 10, a holder ring 11 encircling and supporting the wiper pad, a spring clip 12 for snap-on attachment to a tube, rod or bar in the engine compartment of a car or truck, and a ball joint 13 connecting the ring 11 to the spring clip 12 for universal pivotal adjustment between them.

Figure 3:
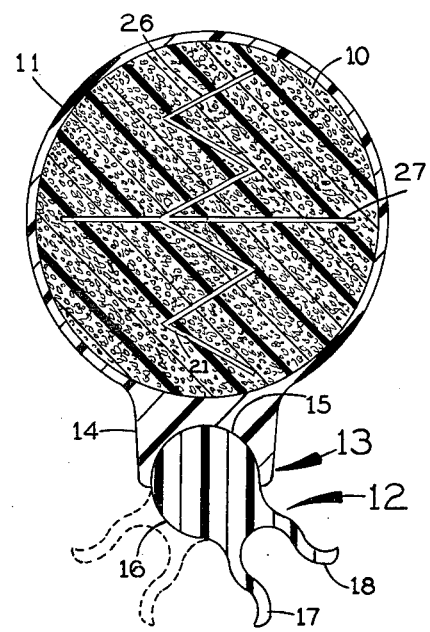
FIG. 3 is a horizontal cross-section taken along the line 3—3 in FIG. 1.
Figure 2:
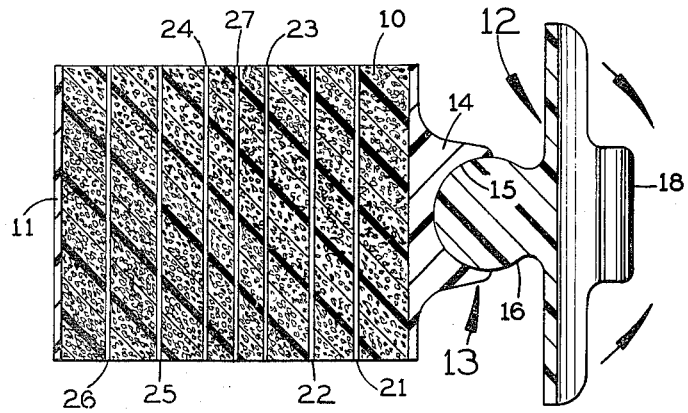
FIG. 2 is a vertical section taken along the line 2—2 in FIG. 1.

The holder ring 11 is a rigid cylinder of metal, plastic or other suitable material in which the wiper pad 10 is secured, preferably adhesively. At one side the holder ring has a radially outwardly projecting boss 14 which presents an outwardly-facing spherical recess 15 (FIGS. 2 and 3).

Figure 4:
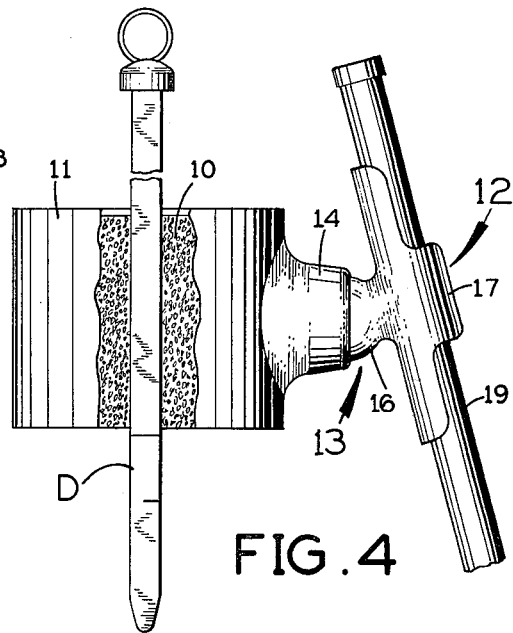
FIG. 4 is an elevational view showing the dip stick wiper of FIG. 1 mounted on the oil filler tube for the vehicle engine, with the wiper pad broken away for clarity where the dip stick is shown inserted in it.
Figure 5:
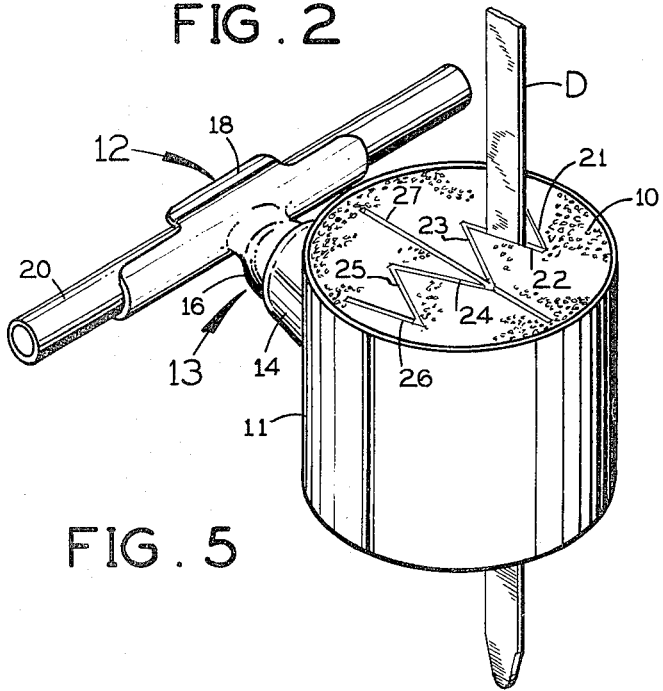
FIG. 5 is a perspective view showing the dip stick wiper mounted on a horizontal tube in the engine compartment.

The spring clip 12 is of generally C-shaped cross-section for most of its length. The opposite extremities of the "C" are sufficiently flexible and resilient that they spread apart slightly when forced over the oil filler tube 19 (FIG. 4) on the engine, after which they spring back toward each other to grip the filler tube firmly. Midway along its length the spring clip carries a spherical ball 16 which projects transversely away from the bight portion of its C-shaped cross-section. This ball has a snug, complementary fit in the recess 15 on the boss 14 so as to provide the aforementioned ball joint connection between the spring clip 12 and the support ring 11 for the wiper pad. On the opposite side from the ball 16, the spring clip presents reversely curved extensions 17 and 18 which facilitate its snap-on assembly to the usual oil filler tube 19 for the engine (FIG. 4) or to some other conveniently located tube, rod or bar, such as the horizontally extending tube 20 as shown in FIG. 5.

Figure 6:
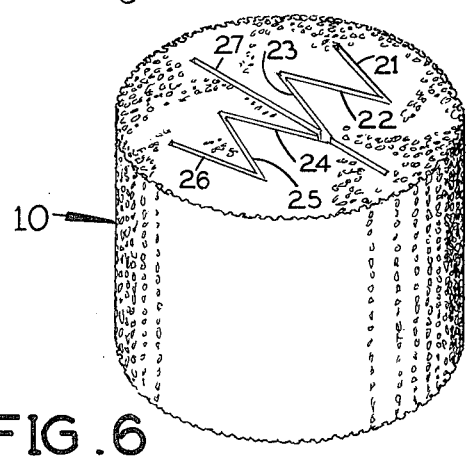
FIG. 6 is a perspective view of the wiper pad in the present dip stick wiper.

As shown in FIG. 6, the wiper pad 10 is a cylindrical body of foam rubber, plastic foam, felt or other suitably soft, deformable, absorptive material. A plurality of narrow slits 21–26 are arranged in a sawtooth pattern extending diametrically across the pad. Each of these slits extends completely through the pad from end to end and each is wide enough to accommodate the dip stick D, as shown in FIG. 5. When the dip stick is inserted down through any individual slit 21, 22, 23, 24, 25 or 26, the opposite major faces of the dip stick are wipingly engaged by the absorbent material of the pad 10 on opposite sides of this slit, so that oil will be wiped from the dip stick and absorbed by the pad. An additional longer slit 27 is provided in the wiper pad 10 for accommodating a twisted dip stick. This longer slit intersects the sawtooth pattern of the smaller slits 21-26 at the middle.

In the use of this dip stick wiper, the fact that there are several slits 21-27, and not just one, enhances its useful life and practical utility because the user may select whichever slit seems to have had the least previous use and therefore should be the most effective for removing oil from the dip stick.

I claim:

1. In a dip stick wiper comprising:

a holder ring;

and an absorbant wiper pad inside said ring formed with a plurality of narrow slits extending the entire length of the pad from end to end, each of said slits being shaped and dimensioned to slidably pass with wiping contact and oil dip stick inserted endwise therethrough;

the improvement wherein:

said slits adjoin one another in succession and form a sawtooth pattern of slits extending across the pad.

2. A dip stick wiper according to claim 1, and further comprising an additional slit extending the entire length of the pad from end to end and transversely intersecting said sawtooth pattern of slits midway across the pad, said additional slit being substantially wider than the slits of said sawtooth pattern.

3. A dip stick wiper according to claim 2, and further comprising:

a spring clip for snap-on attachment to a tube, rod or bar in the engine compartment of an automotive vehicle;

and a ball joint connecting said spring clip to said holder ring to permit universal pivotal adjustment of the holder ring.

* * * * *